April 2, 1963 R. P. PEARSON 3,083,572
FLUID LEVEL SYSTEMS
Filed July 25, 1958
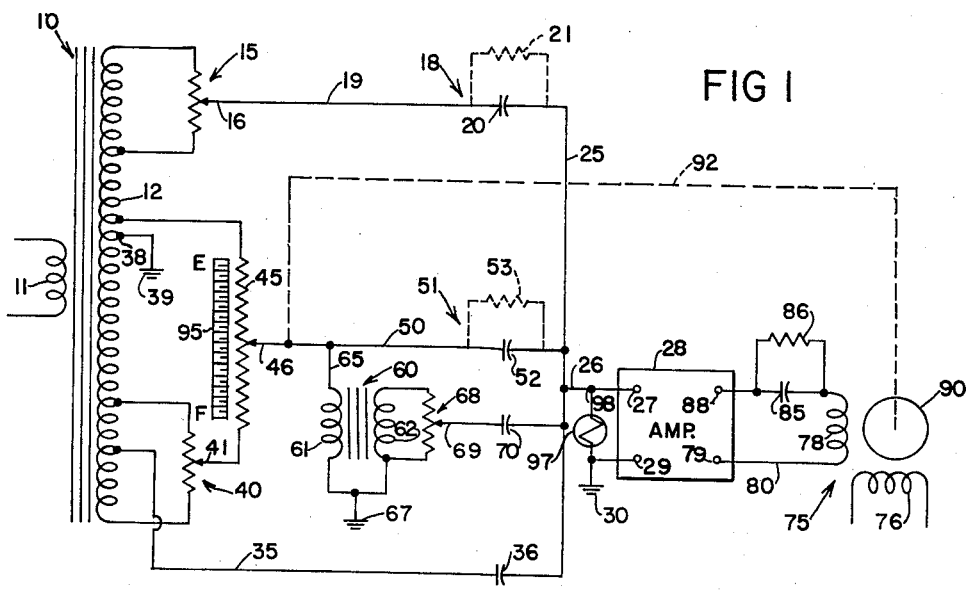
FIG 1
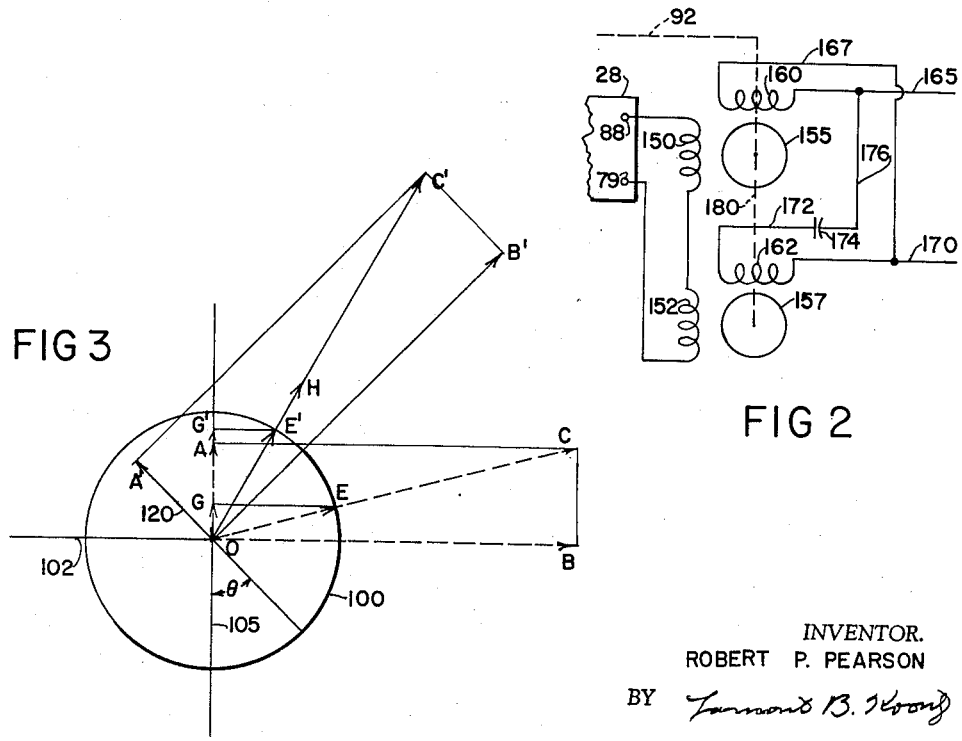
FIG 3
FIG 2
INVENTOR.
ROBERT P. PEARSON
BY
ATTORNEY

United States Patent Office 3,083,572
Patented Apr. 2, 1963

3,083,572
FLUID LEVEL SYSTEMS
Robert P. Pearson, Roseville, Minn., assignor to Minneapolis-Honeywell Regulator Company, Minneapolis, Minn., a corporation of Delaware
Filed July 25, 1958, Ser. No. 751,050
11 Claims. (Cl. 73—304)

This invention relates to a system responsive to the quantity of fluid in a container and more particularly relates to improvements in oil quantity gauging wherein high dissipation factors are frequently encountered. The dissipation factor of liquid has been defined as the ratio of energy dissipated to the energy stored in a capacitor which is measuring the liquid when the liquid is used as a dielectric.

The problem of gauging oil in an aircraft with capacitive type liquid level systems is considerable since oils frequently tend to have high dissipation factors which change with temperature and with a different kind of additives used by the various manufactuers. When gauging most aircraft fuels the dissipation factor is low and the electrical resistance between the plates of the capacitor is extremely high so that the current flowing through the sensing leg of a standard capacitive bridge circuit is essentially completely capacitive. In gauging oils however, where the dissipation factor is high there is in effect a finite resistance existing between the plates of the measuring capacitor which produces a resistive path for current between the plates of the capacitor. The effect of placing this resistance in parallel with the capacitive sensor is to produce a phase shift in the current flowing therethrough different from that which would be seen in a purely capacitive path.

In a normal fuel gauge system an amplifier is connected to the sensing capacitive arm of the bridge and provides an output signal to the control winding of a motor. Normally the line winding of the motor has impressed across it a voltage of a phase in quadrature with the voltage impressed across the control winding by the amplifier. When a resistive path is placed across the sensing capacitor and the normal phase of the current therethrough shifts, it is seen that the phase of the voltage at the output of the amplifier is no longer in quadrature with the voltage across the line winding of the motor. Since only the component in the control winding which is 90 degrees out of phase with the line winding of that motor is effective to cause rotation of the motor, the motor becomes sluggish and unresponsive. The problem is quite serious with large changes in phase angle.

Another problem which is encountered with high dissipation factor liquids is that when the resistance which is effectively placed across the capacitive probe is decreased to a relatively small value, the current present in that leg of the bridge increases. This increase frequently causes the current from the sensing leg of the bridge which is presented to the amplifier to be so large that it surpasses the saturation point of the amplifier so that sluggish operation of the motor occurs.

It is an object of the present invention to provide a liquid level gauge which may be efficiently used with high dissipation factor fluids.

Another object of the present invention is to provide a high dissipation factor fluid gauge system wherein phase shift from the sensing leg of the bridge produces a minimum effect on the efficient operation of a motor controlled thereby.

A further object of the present invention is to provide a high dissipation factor fluid sensing system wherein the current presented to the amplifier is maintained below the saturation point of the amplifier regardless of changes in temperature which produce variations in the dissipation factor of the fluid being sensed.

These and other objects will be more clearly seen from an examination of the following specification and drawings in which:

FIGURE 1 is a schematic representation of one embodiment of the invention;

FIGURE 2 is a schematic representative of a second embodiment of the present invention; and FIGURE 3 is a vector diagram showing various phase relationships in the circuitry of the invention.

Referring to FIGURE 1, a transformer 10 having a primary winding 11 connected to a source of alternating current (not shown) and having a secondary winding 12, provides a source of current for the liquid gauging system. Connected across the upper portion of the transformer secondary 12 is a calibration potentiometer 15 having a movable tap 16 which is connected to the capacitive type level sensor generally shown at 18 by a conductor 19. The sensor 18 is shown as having a capacitive element 20 connected in parallel with a ghost resistance 21 shown in dashed lines. The ghost resistance 21 is placed in parallel with the capacitive type sensor 20 to show the effect of the high dissipation factor due to the oil being sensed by the capacitive probe. The other side of the capacitor 20 is connected by a common conductor 25, and a conductor 26 to the input terminal 27 of an amplifier 28. The other terminal 29 of the amplifier is connected to ground reference 30.

The voltage across potentiometer 15 is either in phase or 180 degrees out of phase with the line voltage on the primary 11 of transformer 10. If the path between the wiper 16 of potentiometer 15 and the input terminal 27 of amplifier 28 were purely capacitive, the current from wiper 16 to the input 27 of amplifier 28 would lead the line voltage by 90 degrees. However, because we are dealing with high dissipation factor fluids, the resistor 21 is effectively connected in parallel with capacitor 20 which produces a phase shift in this current depending upon the relative magnitudes of the resistance and the capacitive reactance of the capacitor 20. If the resistance 21 were very small the current would be large and practically in phase with the line voltage.

Connected near the lower end of the secondary 12 of transformer 10 is a conductor 35 which leads to one side of a capacitor 36, the other side of which is connected by the common conductor 25 and conductor 26 to input terminal 27 of amplifier 28. A center tap 38 on transformer secondary 12 is connected to ground reference potential at 39. It is seen that the voltage on the lower portion of the transformer secondary 12 is 180 degrees out of phase with the voltage existing on the upper portion of transformer secondary 12 and thus the current traveling through the conductor 35 and the capacitor 36 would normally be 180 degrees out of phase with the current traveling through capacitor sensor 20. The size of capacitor 36 is so chosen that the current traveling through it will exactly equal in magnitude but be opposite in phase to the component of current traveling through capacitor 20 due to its capacitance under empty tank conditions.

Connected across the lower portion of transformer secondary 12 is a second calibration potentiometer 40 having a movable wiper 41. Connected between wiper 41 of potentiometer 40 and a point on transformer secondary 12 just above the center tap 38 is a rebalance potentiometer winding 45 having associated therewith a movable wiper 46.

It is seen that the voltage across the rebalance potentiometer 45 is also 180 degrees out of phase with the voltage across the upper portion of secondary 12 so that the voltage on movable tap 46 is likewise 180 degrees out of phase with the voltage on the upper portion of transformer secondary 12.

The movable tap 46 is connected by means of a conductor 50 to a compensator shown generally at 51. The compensator is normally totally immersed in the liquid being sensed and is shown in FIGURE 1 as consisting of a capacitive element 52 and a ghost resistive element 53. Since the compensator 51 is normally in the fuel the dissipation factor produces the same effect on the compensator as it did on the sensor 18 which is the reason for showing the resistive portion 53 by the dashed lines. It is seen that the phase of the current traveling through compensating capacitor 52 would lead the voltage on wiper 46 by 90 degrees if there were no resistive component in the circuit. This current would normally be of the same phase as the current through capacitor 36 and would be 180 degrees out of phase with the current normally traveling through sensing capacitor 20. With a low dissipation factor liquid the sum of the currents through capacitors 52 and 36 would be exactly equal to but opposite in phase to the current passing through capacitors 20 and 70 when the system was in balance. However, with higher dissipation factor fluids, the resistor 53 is present and a phase shift occurs in this rebalance leg of the bridge of the same magnitude as the phase shift occurring in the sensing leg of the bridge through the sensor 18. The current through the compensator 51 then is 180 degrees out of phase with the current passing through the sensor 18 regardless of the dissipation factor. Compensator 51 is connected by the common conductor 25 and conductor 26 to terminal 27 of amplifier 28.

Also connected to movable tap 46 is a phase shifting transformer shown generally at 60 which consists of a primary winding 61 and a secondary winding 62. Primary winding 61 is connected to movable tap 46 by a conductor 65 and has its other end connected to ground reference at 67. Transformer secondary 62 has one end connected to the ground reference at 67 and has connected across it a calibration potentiometer 68 having a movable wiper 69. The purpose of transformer 60 is to reverse the phase of the voltage on wiper 46 so that the voltage on wiper 69 is 180 degrees out of phase therewith or in other words is in phase with the voltage across the upper portion of secondary 12.

Connected to wiper 69 is one side of a capacitor 70 the other side of which is connected by the common conductor 25 and conductor 26 to the input terminal 27 of amplifier 28. The purpose of capacitor 70 is to produce a current which is of equal magnitude but of opposite phase to the current traveling through the capacitor 52 which is due to its capacitance under empty conditions. The function of capacitor 70 is, with respect to capacitor 52, the same as the function performed by capacitor 36 with respect to sensor 20.

Since the current through capacitor 20 which is due to the empty tank capacitance of the sensor is exactly cancelled out by the current through capacitor 36, and since the current through capacitor 52 which is due to the empty tank capacitance of the compensator is exactly cancelled out by the current passing through capacitor 70, the only remaining effective capacitances in the circuit are those in capacitor 20 and capacitor 52 which are due to the liquid dielectric between the plates.

A motor shown generally at 75 has a line winding 76 which is connected to a source of alternating voltage (not shown). The voltage across line winding 76 is in phase with the voltage across winding 11 of transformer 10. The control winding 78 has one end connected to output terminal 79 of amplifier 28 by means of a conductor 80. The other end of control winding 78 is connected to a parallel capacitor-resistor combination consisting of capacitor 85 and resistor 86. The other side of this capacitor-resistor combination is connected to the other output terminal 88 of amplifier 28.

Assume that 85 and 86 were not in the control winding circuit and that a low dissipation factor fuel was being sensed. The voltage from the amplifier 28 would be 90 degrees out of phase with the line voltage. The motor would thus operate efficiently. When a high dissipation factor fluid is sensed, the phase is shifted as explained above and the voltage output from amplifier 28 across control winding 78 would no longer be 90 degrees out of phase with the line voltage across winding 76. Only some component of the voltage output from amplifier 28 would produce rotation of motor 75, and as the dissipation factor increased the phase would shift more and more until the motor became practically inoperative. The purpose of the capacitor 85 and the resistor 86 in parallel is to shift the phase of the control winding by an amount necessary to maximize the component of the voltage in control winding 78 which is 90 degrees out of phase with that in line winding 76. The shift caused by the capacitor-resistor combination would be set at about 45 degrees if the resistance caused by the high dissipation factor liquids could vary due to temperature changes from a high value to a low value so that the current to the amplifier could vary between in phase and 90 degrees out of phase with the line voltage. If the maximum possible phase shift away from a purely capacitive phase was say 50 degrees, the amplifier output would be phase shifted about 25 degrees so as to obtain the maximum component 90 degrees out of phase with line phase possible.

Operating in response to a quadrature phase voltage in control winding 78 is a rotor 90 of motor 75. The rotor 90 is shown controlling the position of wiper 46 by means of a mechanical connection shown as dashed line 92. Whenever rotor 90 moves because of a quadrature phase voltage on control winding 78, connection 92 is effective to position wiper 46 so that the magnitude of the voltage presented to amplifier 28 is reduced to zero at which time the rotor 90 stops.

Associated with wiper 46 of rebalance potentiometer 45 is a scale 95 calibrated in terms of fluid quantity. The position of wiper 46 with respect to scale 95 at any condition of balance provides an indication of the quantity of liquid which is being sensed by the sensor 18.

A negative temperature coefficient resistor 97 is shown connected at one end to the input terminal 27 of amplifier 28 by means of a conductor 98 and conductor 26 and has its other end connected to the ground reference at 30. The purpose of negative temperature coefficient resistor 97 will also be further explained below.

Referring to FIGURE 3 the purpose of the phase shifting combination of capacitor 85 and resistor 86 may be more clearly seen. In FIGURE 3 the circle 100 represents the voltage at which the amplifier 28 will be saturated. A horizontal line 102 represents the phase of the line voltage which phase exists in the line winding 76 of motor 75 and in primary 11 of transformer 10. The only voltage which will have any effect on the rotor 90 of motor 75 must be in quadrature with this line voltage phase and this quadrature phase is represented by the vertical line 105. Vertical dashed line arrow OA represents the capacitive component of current from the sensing arm of the bridge which is presented to the amplifier 28 and which would induce a voltage in winding 78 of motor 75 in phase quadrature with the line voltage phase if that were the only current present in the sensing arm. Dashed line arrow OB represents the resistive component of the current presented to amplifier 28 from the sensing leg of the bridge due to the resistance 21 caused by the high dissipation factor of the fluid being sensed. The resultant phase of the current presented to amplifier 28 can be represented by the dashed line OC which is the vector resultant of the two components OA and OB. The only portion of the resultant current which is useable is that portion within the saturation voltage of the amplifier 28 and that portion is shown as dashed arrow OE. Dashed arrow OE then represents effectively the phase and magnitude of the voltage in control winding 78 due to the capacitive and resistive currents induced by the sensor 18. Since the only useful component of voltage in control winding 78 is that which is in quadrature with the line voltage phase in 76, the only component of the voltage represented by dashed arrow OE which is effective to control rotor 90 of motor 75 is that portion of arrow OA represented by dashed arrow OG. It is seen that this is small compared to arrow OA and as the resistive current represented by dashed arrow OB increases, the amount of effective control voltage in control winding 78 decreases and the motor 75 becomes unresponsive.

Now assume the phase shifting resistor capacitor combination 86 and 85 is effective to shift the phase of the output voltage from amplifier 28 by an angle $\theta$. This effectively places the capacitive component of the current from the sensing arm of the bridge in a direction shown by arrow OA' and the resistive component of the current from the sensing portion of the bridge in a direction shown by arrow OB', and thus the resulting phase and magnitude of the current presented to the amplifier 28 is seen by the arrow OC'. The only portion of arrow OC' which is effective to control the motor is that which is below the saturation voltage of the amplifier and is shown by arrow OE'. It is seen that the component of the current represented by OE' which is in quadrature with the line voltage phase is shown by arrow OG' which is much larger than arrow OG. The voltage then in control winding 78 which is in phase quadrature with the line voltage phase is much larger than was the case before the amplifier's output was shifted by the angle $\theta$. If $\theta$ were 45 degrees and if the current through the sensor 18 was entirely capacitive at least 70.7% of the useable voltage would be effective to control the motor and if the current through the sensor 18 were entirely resistive the same would be true. Anywhere between these two extremes the percentage would be higher. It is seen that by phase shifting the output of the amplifier 45 degrees the efficiency of the motor varies between 70.7% of its normal value and 100% of its normal value. The addition of the phase shifting capacitor-resistor combination 85, 86 is thus seen to produce a very desirable improvement over the system without such arrangement. It should be understood that the phase shifting resistor-capacitor combination could just as easily be placed in the line winding 76 or the phase shift could be accomplished internally of the amplifier 28 and the same result would be accomplished.

Referring back to FIGURE 1 the purpose of the negative temperature coefficient resistor 97 will now be explained. The negative temperature coefficient resistor 97 is placed in the liquid being sensed along with the sensor 18 so that any changes in temperature affecting the sensor 18 also affect the resistor 97. As the temperature surrounding a negative temperature coefficient resistor increases the resistance thereof decreases and this resistor is placed in the circuit of FIGURE 1 in such a way as to allow current from the sensing bridge to drain off to ground potential across the input of the amplifier 28. It is seen then that as the dissipation factor changes with increase or decrease in the temperature of the liquid being sensed the resistor 21 will cause current changes in the circuit but at the same time the resistor 97 will change in value to compensate for this increase or decrease in current. For example assume that the liquid increases in temperature thereby decreasing the resistor 21 which is in parallel with the sensing capacitor 20 producing an increase in current through the sensing leg of the bridge. At the same time since the negative temperature coefficient resistor 97 is placed in the liquid the resistance thereof decreases so that more of the current being presented to the amplifier is drained off to ground potential and in so doing prevents the amplifier from becoming saturated. The characteristics of the negative temperature coefficient resistor are so chosen that it allows the amplifier 28 to be unaffected by temperature changes, that is, the increase in current due to the resistance of the fluid is exactly compensated by an increase of drain off current through the thermistor; it is seen that saturation can thus be avoided. By avoiding saturation the amplifier 28 retains its sensitivity which it would otherwise lose and the circuit as a whole performs in a much more efficient manner. Elimination of saturation of the amplifier also prevents super sensitivity when the rebalance current from the lower portion of the bridge has become almost equal to the unbalanced current from the sensing arm of the bridge and this effect can be seen in FIGURE 3. Assume that the unbalance current is represented by arrow OC' and that the rebalance current from the lower portion of the bridge is enough to reduce the input to the amplifier by about half so that the total current which would be presented to the amplifier 28 could be represented by arrow OH at this point. It is thus seen that as the rebalance current has reduced the unbalance current by almost half, yet the arrow OH is still beyond the range of amplifier maximum sensitivity, that is, the saturation point as shown by circle 100 and the motor amplifier combination is just as sensitive as it was with the full unbalance signal presented to it. As the rebalance signal increases the unbalance signal to the amplifier decreases until finally a null condition is reached. However at each step the sensitivity of the amplifier is much larger than it would have been had the amplifier not become saturated.

By inclusion of the negative temperature coefficient resistor 97 the unbalance signal which was represented by arrow OC' would now be represented by arrow OE' and it is seen that if that signal is reduced by half the effect on the amplifier and motor combination is much less than when the unbalance signal represented by arrow OC' was reduced by half. The effect of this was to prevent oscillations and super sensitivity in the area approaching the balanced condition and allows the system to come to a stable balanced condition.

Referring now to FIGURE 2 an alternate scheme for producing the same result as that shown in FIGURE 1 is shown. The circuit up to the amplifier 28 is identical with that of FIGURE 1 and has been omitted from FIGURE 2. In FIGURE 2 the outputs 88 and 79 of amplifier 28 have two separate control windings 150 and 152 connected in series across them. Associated with each of the control windings 150 and 152 is a motor rotor 155 and 157 respectively. A pair of line windings 160 and 162 are associated with rotors 155 and 157 respectively. Line winding 160 is connected to a source of alternating voltage not shown, by means of conductors 165 and 167 and line winding 162 is connected to the same source of alternating current by means of conductors 170 and by means of conductor 172, capacitor 174 and conductor 176. The purpose of capacitor 174 is to provide the line winding 162 with an alternating voltage which is 90 degrees out of phase with the alternating voltage existing across line winding 160. The rotors 155 and 157 are mechanically linked by connection shown as dashed line 180 and this connection is joined to the mechanical connection 92 which leads to the rebalance potentiometer in the same manner as that shown in FIGURE 1. It is seen then that the line winding 162 is 90 degrees out of phase with the line winding 160 and hence motor rotor 157 will respond to voltages in control winding 152 which are 90 degrees out of phase with the voltages in control winding 150. As stated previously the output from amplifier 28 contains a resistive and a capacitive component of voltage 90 degrees out of phase with respect to each other. This voltage is presented across both control winding 150 anod 152 and the capacitive component of voltage causes the motor rotor 155 to turn while the resistive component of voltage causes the motor rotor 157 to turn. These two rotors are connected in such a relationship that the movement caused by the capacitive component of current is in the same direction as the movement caused by the resistive component of the current and hence the movement of mechanical connection 92 depends upon the sum of these rotations. If the current coming from the sensing leg of the bridge were entirely capacitive the control winding 150 would be effective to turn motor rotor 155 in the standard efficient manner. If the current from the sensing leg of the bridge were entirely resistive, which is almost possible with very high dissipation factors, the winding 152 would be responsive to control the position of rotor 157 while rotor 155 would not be affected by the voltage in control winding 150. Under either condition the voltage is effective to produce movement of connection 92 and hence cause the rebalance potentiometer to move in the correct direction. Under any condition of phase between the two extremes mentioned above both rotors 157 and 155 will tend to turn also causing maximum efficiency of the mechanical connection 92.

It is seen therefore that a system has been provided which will respond efficiently to currents produced by a liquid level sensing bridge in which the liquid being sensed has a high dissipation factor. Further it has been shown that a workable circuit is present in which the amplifier will not become saturated and much more efficient operation has been accomplished.

Many changes and modifications will be obvious to one skilled in the art as for example the phase shifting could be accomplished in the line phase of FIGURE 1 and in FIGURE 2 the phase shifting capacitor could exist at the output of amplifier 28. The invention is not intended to be limited by the specific disclosures herein since these and many other modifications could be made and I intend only to be limited by the following claims.

I claim:

1. Apparatus of the class described comprising, in combination: rebalance capacitance type fluid quantity indicating circuitry operable to produce electrical signals upon change in fluid quantity the signals having a magnitude which varies with the temperature of the fluid; voltage responsive means having first and second input terminals; conductive means connecting a first input terminal of said voltage responsive means to said fluid quantity indicating circuitry; and negative temperature coefficient resistor means mounted in the fluid and connected across the input terminals of said voltage responsive means to bypass various portions of the electrical signals in accordance with the temperature of the fluid.

2. In combination: a condition sensing circuit having a first electrical output of a phase relationship which varies between a first and a second limit; an amplifier having an input connected to said circuit to receive the first output and having a second electrical output; motor means having a line winding and a control winding; means connecting the line winding of said motor means to a source of voltage of substantially fixed phase, the phase of said source being less than 90° with respect to said second limit and more than 90° with respect to said first limit; and means connecting the control winding of said motor to the output of said amplifier, said last named means including means shifting the phase of the second electrical output an amount which places said first limit in a phase relationship which is equal to substantially one half the difference in phase between said first and second limits plus approximately 90° with respect to said fixed phase.

3. Liquid quantity sensing apparatus adapted to measure the quantity of a liquid which has a finite resistance, comprising: a liquid level sensing capacitor adapted to produce an electrical signal indicative of the quantity of liquid being sensed and having a phase which depends upon the relative magnitudes of the capacitance and the resistance between the plates of the sensing capacitor; amplifier means having a pair of input terminals and an output; means connecting one of the input terminals to said sensing capacitor to receive the signal therefrom; negative temperature coefficient resistor means positioned in the liquid and connected across the input terminals; motor means connected to the output to be controlled thereby; said motor means having a control winding, a line winding and a rotor; and a phase shifting capacitor connected in series with said one winding of said motor means to shift the phase of a signal applied thereto a predetermined amount with respect to a signal applied to the other winding of said motor means to assure that the rotor will respond both to the phase in the control winding produced as a result of the capacitance of said sensing capacitor and that produced as a result of the resistance of the liquid being sensed.

4. Apparatus of the class described comprising, in combination: a rebalance capacitive type liquid level sensing circuit having an output which varies in magnitude with the level of the liquid and with the temperature of the liquid; amplifier means having a pair of input terminals; means connecting said amplifier means to the output of said circuit; and negative temperature coefficient resistance means mounted in the liquid and connected across the input terminals of said amplifier to bypass various portions of the output of said circuit in accordance with the temperature of the liquid.

5. Apparatus of the class described comprising, in combination: an amplifier having a pair of input terminals and a pair of output terminals; motor means having a line winding and a control winding; condition responsive means operable to produce an electrical signal of phase variable between a first and a second limit; means connecting the input terminals of said amplifier means to said condition responsive means to receive the signal therefrom; means connecting the control winding of said motor means across the output terminals of said amplifier means; and phase shifting means connected to said motor means shifting a point in the phase of the electrical signal which is one half the difference between said first and second limit so that it is substantially 90 degrees out of phase with respect to a signal applied to said motor line winding.

6. Apparatus of the class described comprising, in combination: condition sensing means producing an electrical signal; amplifier means having a pair of input terminals and an output; means connecting the input terminals of said amplifier means to said condition sensing means to receive the signal therefrom; negative temperature coefficient resistor means connected across the input terminals of said amplifier means and positioned in the same temperature environment as said condition sensing means; motor means connected to the output of said amplifier means for operation thereby; and phase shifting means connected to said motor means.

7. Apparatus for use with a fluid measuring system having an output signal the magnitude and phase of which varies with the temperature of the fluid comprising, in combination: an amplifier having an input and an output; means connecting the input of said amplifier to receive the output signal from the fluid measuring system; negative temperature coefficient sensing means positioned in said fluid which varies in resistance in accordance with the temperature of the fluid; means connecting the last named means across the input of said amplifier to shunt varying portions of the output signal from said fluid measuring system in accordance with the temperature of the fluid; motor means having first and second winding means; means connecting the first winding means to receive the output of said amplifier as a control signal; means energizing the second winding means with signals of a first phase; and phase shifting means connected to said motor means operable to cause the signals in the first and second winding means to be shifted in phase a predetermined amount with respect to each other under specific conditions of fluid temperature.

8. In a capacitive liquid level sensing circuit wherein the liquid being sensed has a variable resistance; a capacitive liquid level sensing probe inserted in the liquid being sensed and operative to produce a first electrical signal which shifts in phase between first and second limits and the actual phase of which is dependent upon the relative magnitudes of the capacitance of the probe and the resistance across the probe due to the liquid being sensed; voltage responsive means connected to receive said first electrical signal and including output means operative to produce a second electrical signal of magnitude which is a function thereof; load means including reference and control input means; and phase shifting means connected between said output means of said voltage responsive means and said control input means of said load means operable to shift the phase of the first electrical signal an amount necessary to shift a point intermediate between said first and second limits to a position substantially 90 degrees out of phase with respect to a signal applied at said reference input means of said load means.

9. Apparatus of the class described comprising, in combination: condition sensing means capable of producing an output voltage which is composed of resistive and capacitive components, said components being individually susceptible to variation in magnitude; negative temperature coefficient sensing means connected to said condition sensing means and located in the environment of the condition sensing means and operable to reduce said output voltage as the temperature of the environment rises; motor means connected to receive voltage from a reference voltage source and connected to receive said resistive and capacitive components of said output voltage from said condition sensing means; and phase shifting means connected to said motor means to shift the voltage applied to one winding of said motor means so that said motor means will produce an optimum output while having only a resistive component or only a capacitive component or any combination of the two components applied thereto.

10. Apparatus of the class described comprising, in combination: a condition sensing system having an output voltage of a phase relationship to a reference voltage which is variable between first and second limits; motor means having line winding means for connecting to a source of reference voltage and control winding means connected to receive the output voltage of said condition sensing system, said motor means being positioned in accordance with the condition being sensed; phase shifting means connected to said motor means and operable to shift the phase of the voltage applied to one winding of said motor means with respect to the voltage applied to the other winding of said motor means by an amount necessary to place the average phase relationship of the first and second limits of the output voltage applied to said motor means in quadrature with respect to the reference voltage.

11. Apparatus of the class described comprising, in combination: a condition sensing circuit having an output signal of a phase relationship to a reference signal which may vary on either side of a midpoint value; motor means including first and second windings, said motor means being connected to receive the output signal of said condition sensing circuit at one winding and connected to receive a signal from a reference source at the other winding; and phase shifting means connected to said motor means to shift the phase of the signal in said first winding by a predetermined amount with respect to the signal in said second winding which is sufficient to place the midpoint value of the output signal substantially 90 degrees out of phase with respect to the reference signal.

References Cited in the file of this patent

UNITED STATES PATENTS

| | | |
|---|---|---|
| 2,769,338 | Hermanson | Nov. 6, 1956 |
| 2,785,316 | Kingsbury | Mar. 12, 1957 |
| 2,808,471 | Poucel et al. | Oct. 1, 1957 |
| 2,867,120 | Schafer | Jan. 6, 1959 |
| 2,870,393 | Whitehead | Jan. 20, 1959 |
| 2,918,818 | Meyer | Dec. 29, 1959 |